United States Patent [19]

James

[11] 4,288,965

[45] Sep. 15, 1981

[54] FORM-FILL-SEAL PACKAGING METHOD AND APPARATUS

[75] Inventor: Robert C. James, Sheboygan, Wis.

[73] Assignee: Hayssen Manufacturing Company, Sheboygan, Wis.

[21] Appl. No.: 69,828

[22] Filed: Aug. 27, 1979

[51] Int. Cl.[3] .................... B65B 9/06; B65B 57/04
[52] U.S. Cl. ........................................ 53/451; 53/64; 53/551
[58] Field of Search .............. 53/451, 450, 552, 554, 53/551, 550, 389, 64; 93/20, 82

[56] References Cited

U.S. PATENT DOCUMENTS

| 2,113,658 | 4/1938 | Lakso | 53/551 |
| 2,741,079 | 4/1956 | Rausing | 53/551 |
| 2,966,021 | 12/1960 | Lane et al. | 53/552 |
| 2,969,627 | 1/1961 | Leasure | 53/451 |
| 3,071,907 | 1/1963 | Järund | 53/64 |
| 3,449,888 | 6/1969 | Gausman | 53/552 |
| 3,530,642 | 9/1970 | Leimert | 53/551 |
| 4,117,647 | 10/1978 | Rossi | 53/551 X |
| 4,171,605 | 10/1979 | Putnam, Jr. et al. | 53/552 |

Primary Examiner—Horace M. Culver
Attorney, Agent, or Firm—Senniger, Powers, Leavitt and Roedel

[57] ABSTRACT

A form-fill-seal packaging method and apparatus in which a web of flexible packaging material is pulled from a supply and fed over a device for forming it into tubing, product to be packaged is provided in the tubing, and the tubing is sealed to form packages, and in which the web is pulled forward from the supply as one operation and the tubing is drawn forward and thereby taken up as an accompanying but separate operation with the take-up such that the web is pulled over the forming device under tension.

32 Claims, 9 Drawing Figures

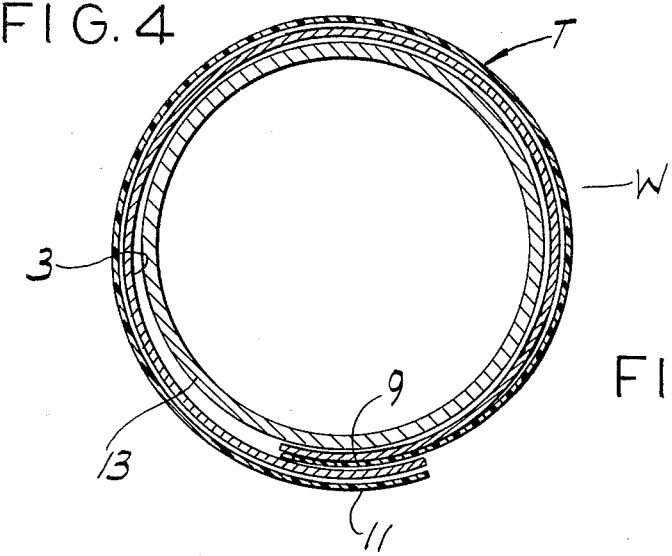
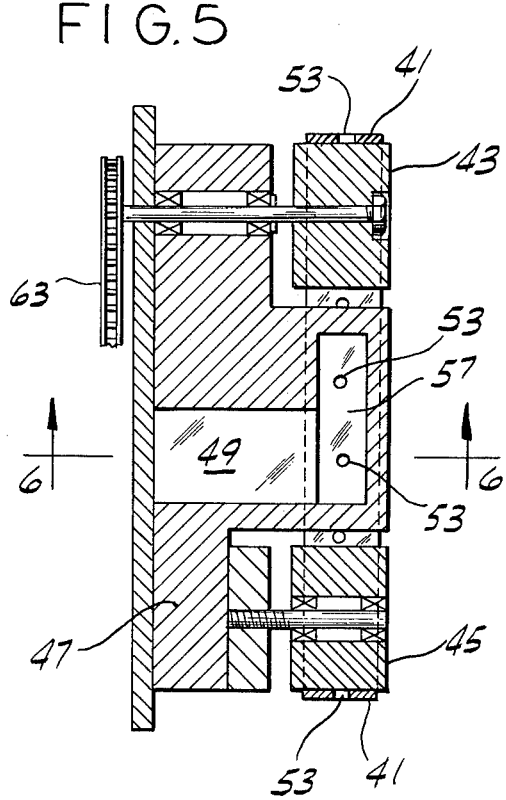
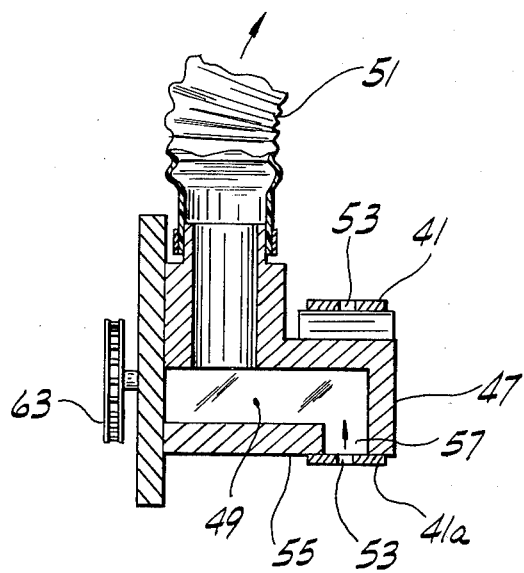
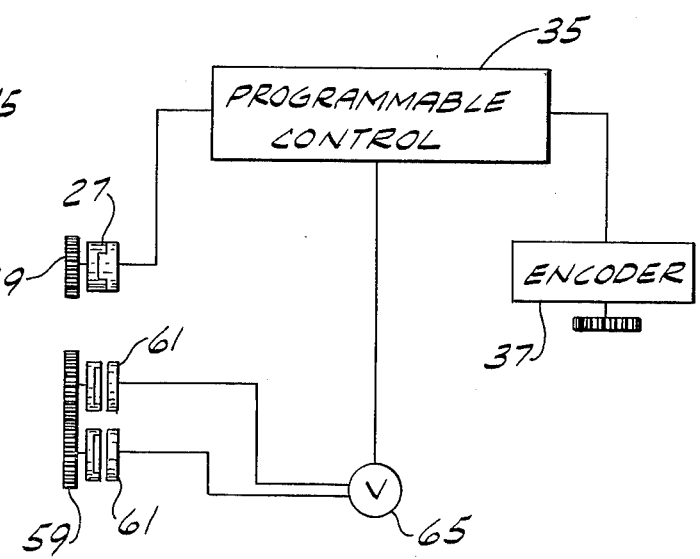

FORM-FILL-SEAL PACKAGING METHOD AND APPARATUS

BACKGROUND OF THE INVENTION

This invention relates to packaging methods and apparatus, and more particularly to a form-fill-seal packaging method and apparatus.

The invention is especially concerned with a method of and apparatus for forming, filling and sealing packages in which a web of flexible sheet packaging material is pulled from a supply and fed over means for forming it into tubing, product to be packaged being provided in the tubing, and the tubing being sealed to form packages.

One type of apparatus in which the invention may be used is a machine of the so-called vertical form-fill-seal class in which a web of flexible packaging material is guided from a supply roll of the material over a forming shoulder, at which it is formed into tubing, the tubing being intermittently fed downward, sealed to form a longitudinal tube seam, and ultimately sealed at package length intervals (and cut into individual packages). Heretofore, there have been four basic subclasses, generally, of this class of vertical form-fill-seal machine in commercial use as follows:

1. The type having a vertically reciprocating carriage carrying a set of sealer bars for sealing the tubing at package length intervals, the bars closing on the tubing generally at the upper end of the upstroke of the carriage, pulling a package length increment of the tubing downward on the downstroke of the carriage, and then opening for the upstroke, as sold by Hayssen Manufacturing Company of Sheboygan, Wis., assignee of this invention, and a number of other companies.

2. The type having belts engaging the tubing on a mandrel to feed it downward in package length increments, with a dwell between successive feed cycles, a set of sealer bars being operable in a fixed horizontal plane below the lower end of the mandrel during each dwell to form a transverse seal across the tubing.

3. The type in which the forming shoulder is vertically reciprocable for feeding the tubing downward in package length increments, with a dwell between successive feed cycles, a set of sealer bars being operable in a fixed horizontal plane during each dwell to form a transverse seal across the tubing.

4. The type having vertically reciprocating vacuum grippers (vacuum boxes) engageable with the tubing on a mandrel, or a vertically reciprocating fin seal gripper (the longitudinal seam for the tubing being a fin seal in this case, as distinguished from a lap seal), for feeding the tubing downward in package length increments, with a dwell between successive feed cycles, a set of sealer bars being operable in a fixed horizontal plane below the lower end of the mandrel during each dwell to form a transverse seal across the tubing.

Problems such as the following may at times be encountered in the operation of packaging machines of these types:

(A) The pull on the tubing required to draw the material over the forming shoulder and feed it downward, i.e., either the so-called "breakaway pull", which is the pull required to start the feed of the material and the tubing following a dwell, or the "continuous pull", which is the pull required to keep the material moving, may be so high for certain materials as to tend to degrade the material, by inducing severe stresses particularly at the shoulder area and may further cause stretching of the packaging material in other instances, and to degrade the material from the standpoint of appearance;

(B) The machine may have to be operated at a lower package production rate than desired; and (C) The material fails to track properly over the forming shoulder, reducing efficiency of operation.

SUMMARY OF THE INVENTION

Accordingly, among the several objects of this invention may be noted the provision of a method of and apparatus for forming, filling and sealing packages wherein a web of flexible packaging material is pulled from a supply and fed over means (e.g., a forming shoulder) for forming it into tubing, and wherein product to be packaged is provided in the tubing and the tubing is sealed to form packages, with improved tracking of the packaging material for improved machine efficiency; the provision of such a method and apparatus wherein the pull on the tubing required to draw the packaging material over the forming means is reduced to avoid subjecting the packaging material to unduly high tension, thus avoiding degradation of the material; the provision of such a method and apparatus enabling production of packages at a relatively high rate; and the provision of such apparatus which may be more economically constructed and which may be of lower height than prior apparatus, particularly prior apparatus of the first type above mentioned.

In general, in carrying out the method of this invention for forming, filling and sealing packages, a web of flexible packaging material is pulled from a supply and fed over means for forming it into tubing product to be packaged is provided in the tubing, and sealing operations are performed on the tubing to seal it to form packages. The web is pulled from the supply, measured for each sealing operation, and fed toward the forming means by applying a forward force to the web between the supply and the forming means. A forward force is applied separately to the tubing tending to draw the tubing forward, the latter force being applied to the tubing at a rate such as to pull the material forward over the forming means with the material under tension to maintain it taut. The measurement of the web for each sealing operation is effected before the forming of the web by the forming means.

Apparatus of this invention carries out this method, generally comprising web feeding and measuring means located between the supply and the forming means for applying a forward force to the web between the supply and the forming means for measuring the web for each sealing operation and feeding the web forward toward the forming means, and tubing feeding means downstream from the forming means for applying a forward force separately to the tubing to draw the tubing forward, the latter force being applied to the tubing at a rate such as to pull the material forward over the forming means with the material under tension to maintain it taut. The web feeding and measuring means is operable to effect the measurement of the web for each sealing operation before the forming of the web by the forming means.

Other objects and features will be in part apparent and in part pointed out hereinafter.

BRIEF DESCRIPTION OF THE DRAWINGS

FIG. 4 is an enlarged horizontal section generally on line 4—4 of FIG. 2;

FIG. 5 is an enlarged vertical section generally on line 5—5 of FIG. 2;

FIG. 6 is a section generally on line 6—6 of FIG. 5;

FIG. 7 is a diagram of a control circuit for FIG. 1; and

Corresponding reference characters indicate corresponding parts throughout the several views of the drawings.

DESCRIPTION OF THE PREFERRED EMBODIMENTS

Figure 1:
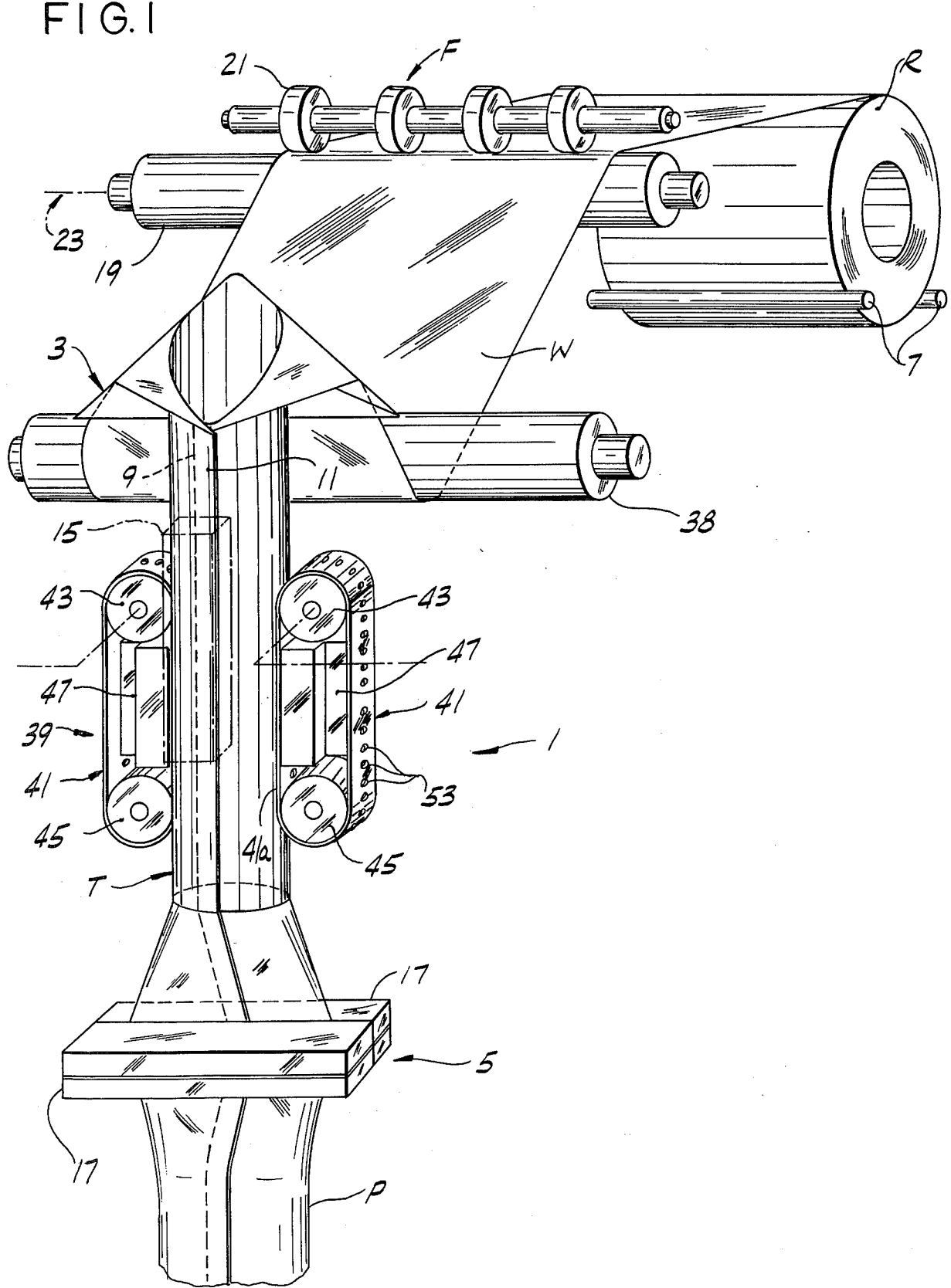
FIG. 1 is a perspective of a vertical form-fill-seal machine of this invention, and illustrating the method of this invention.

Referring first more particularly to FIG. 1 of the drawings, there is generally indicated at 1 a vertical form-fill-seal apparatus of this invention, in which a web W of flexible packaging material is pulled from a supply, fed over means 3 for forming the web into tubing T, product to be packaged is provided (in any of various suitable well-known ways) in the tubing, and sealing operations are performed on the tubing as generally indicated at 5 (again in any of various suitable well-known ways) to seal it to form packages. The packaging material may be low density polyethylene film, for example, and the supply may be constituted by a roll R of the film suitably supported as indicated at 7. The forming means 3 may be a forming soulder generally of a conventional type such as shown, for example, in the coassigned U.S. Pat. Nos. 3,050,906 issued Aug. 28, 1962, 3,449,888 issued June 17, 1969, and 3,664,086 issued May 23, 1972.

Figures 2, 3:
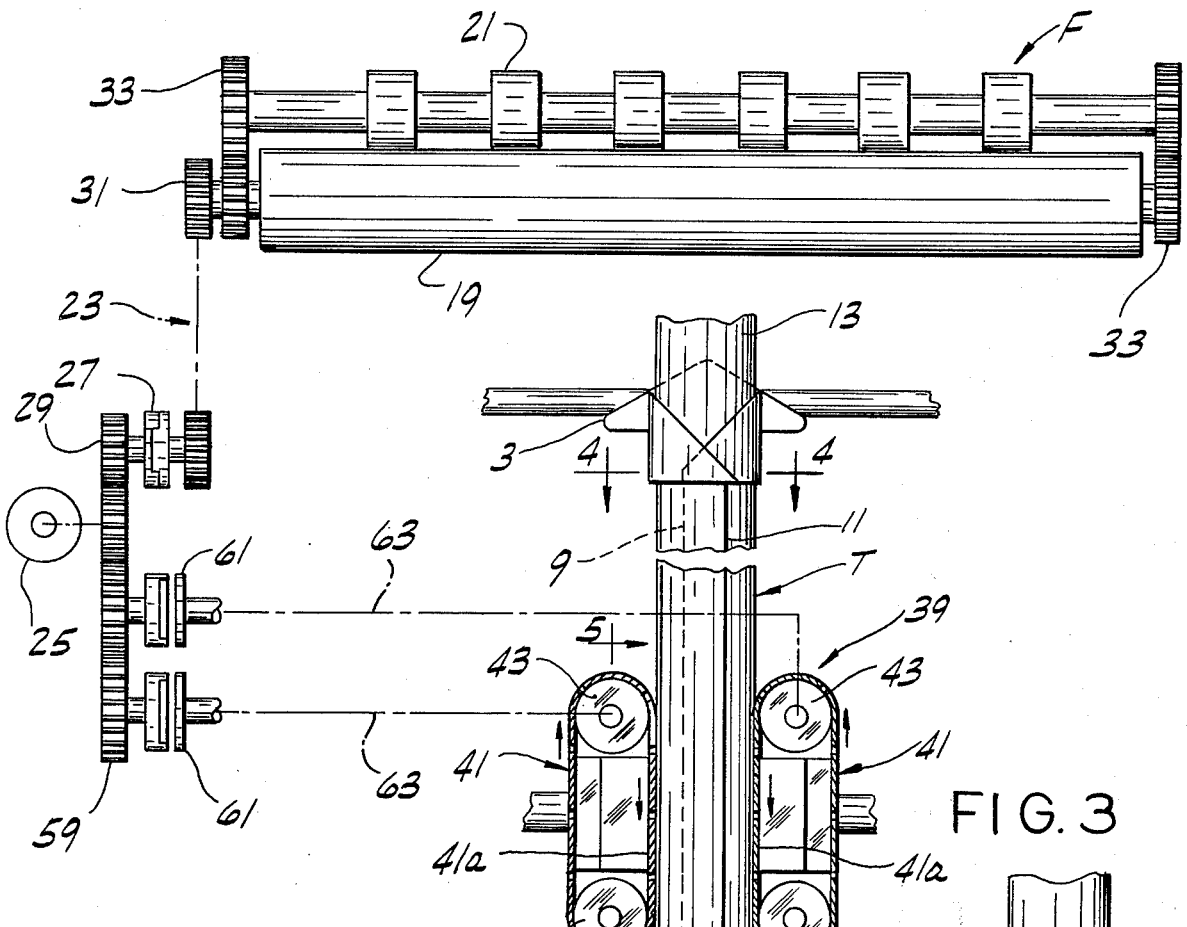
FIG. 2 is a front elevation of FIG. 1, showing certain drive mechanism of the machine.
FIG. 3 is a side elevation of the lower part of FIG. 2.

As shown in FIGS. 1, 2 and 4, the forming shoulder 3 forms the web W of packaging material into the tubing T with the longitudinal margins 9 and 11 of the web W in lapping relationship, and directs the tubing downwardly around a vertically extending, hollow mandrel 13 (also as shown, for example, in the above-mentioned coassigned U.S. patents). As illustrated, margin 9 is on the inside, margin 11 on the outside. At 15 in FIG. 1 is diagrammatically indicated suitable means for sealing the lapping margins 9 and 11 of the web to form a longitudinal seam for the tubing. Product is provided in the tubing T via the hollow mandrel 13 in suitable conventional manner, and the tubing is transversely sealed at package length intervals by the sealing means indicated at 5 below the lower end of the mandrel. The sealing means 5 may, for example, comprise a pair of sealing bars each designated 17 operable in a fixed horizontal plane below the lower end of the mandrel to form a top seal for the package being completed and the bottom seal for the next package to be formed. The seal bars may have cutting means incorporated therein (as is conventional) for cutting transversely between the seals made at 5 to separate the completed package P from the tubing. In the embodiment of the invention illustrated in FIGS. 1-7, the tubing is intermittently fed forward, which is downward, one package length increment, the seal bars 17 being open. The tubing dwells between successive feed cycles, the seal bars being closed on the tubing for the transverse sealing operation during each dwell. Suitable means, which may be wholly conventional and well known in the art, is used for moving the seal bars toward and away from one another.

The web W is intermittently pulled from supply roll R, measured for each sealing operation at 5, and fed forward toward the forming shoulder 3 by means indicated generally at F located between the supply roll and the forming shoulder. This means F is intermittently operable to apply a forward force to the web at a position between the supply roll and the forming shoulder for feeding the web forward one package length increment in a given interval. Thus, it acts as a web feeding and measuring or metering means. As illustrated, it comprises a lower roll 19 and an upper roll 21 with means indicated generally at 23 for intermittently driving these rolls through a predetermined interval corresponding to the desired length for the packages to be formed to feed the web forward one such increment. As shown in FIG. 2, the driving means 23 comprises a continuously operating electric motor/speed reducer unit 25 driving the input of an electric clutch/brake unit 27 via gearing indicated at 29, the output of the clutch/brake unit being connected to the lower roll 19 as indicated at 31. The rolls 19 and 21 are geared together as indicated at 33. The clutch of unit 27 is adapted intermittently to be engaged and the brake of unit 27 disengaged for driving the rolls 19 and 21 to feed forward the requisite package length increment of web W on each feed cycle by a suitable programmable control 35 which is under the control of an encoder 37 (see FIG. 7), the clutch being disengaged and the brake engaged to terminate the feed cycle and remaining so for the dwell of the web W and tubing T, the clutch then being engaged and the brake disengaged for the next feed cycle.

The web W travels from the measuring and feeding rolls 19 and 21 under a guide roll 38 and thence up to and around forming shoulder 3. The increment of the web W fed forward by the measuring and feeding rolls 19 and 21 is taken up and pulled over the forming shoulder 3 under tension by tubing feeding means indicated generally at 39 in FIGS. 1 and 2 below (downstream from) the forming shoulder. This tubing feeding means 39 acts to apply a forward (downward) force to the tubing T, separately from the application of force to the web W by the rolls 19 and 21, and externally of the tubing, at a rate such as to pull the web over the forming shoulder 3 under tension to maintain the web taut. In this regard, the tubing feeding means tends to draw the tubing down (forward) on the mandrel 13 a distance greater than the package length increment in the stated interval of operation of the rolls 19 and 21. The drawdown force on the tubing is relatively low. While means 39 tends to draw the tubing T down a greater distance than the package length increment, the tubing is drawn down only a distance corresponding to the package length increment (the tension is insufficient to stretch it to any substantial extent), and the package length increment of the web W metered out and fed forward by the rolls 19 and 21 is thereby taken up and pulled over the forming shoulder 3 under tension, with the tension substantially uniform for proper tracking of the material over the forming shoulder.

The tubing feeding means 39, as illustrated, comprises a pair of endless belts, and more particularly a pair of vacuum belts each designated 41 at opposite sides of the mandrel 13 (for vacuum gripping the tubing to feed it downward). Each belt is a flat belt trained around an upper pulley 43 and a lower pulley 45 and so arranged as to have a downwardly movable inner reach 41a engageable with the tubing T at the respective side of the mandrel 13. The two pulleys for each belt are mounted on a block 47 having a vacuum passage 49 therein (see FIGS. 5 and 6) in which a vacuum is drawn in suitable conventional manner via a vacuum hose 51. The belt has holes 53 spaced at suitable intervals throughout its length. The inner reach 41a of the belt travels in sealing engagement with the face 55 of the block 47 toward the mandrel 13, i.e., the inside of the block, in register with one end 57 constituting the inlet end of the vacuum passage 49 in the block. As the belt travels pass inlet 57, vacuum is drawn through those holes 53 in the belt which are in communication with the inlet. The tubing on the mandrel 13 is thereby vacuum gripped to the inner reach 41a of the belt for being fed downward by the belt.

The vacuum belts 41 are operated intermittently for feeding the tubing T downward on the mandrel 13 concurrently with each operation of the web feeding rolls 19 and 21. The belts may be started in operation generally at the same time or somewhat before the rolls 19 and 21 start feeding the web W. They are operated at such a rate relative to the rolls 19 and 21 as to tend to feed the tubing downward at a rate faster than that at which rolls 19 and 21 feed the web forward, and may be stopped generally at the same time or shortly after the rolls 19 and 21 stop. Means for operating the belts in this manner is shown to comprise a gear drive 59 from the electric motor/speed reducer unit 25 to the input of each of a pair of air-operated slip clutches each designated 61, with individual drive trains as indicated at 63 from the outputs of the slip clutches to the upper pulleys 43 for the two belts 41. The slip clutches 61 are under control of an air valve 65 (FIG. 7) which is in turn controlled by the programmable control 35. The latter functions to actuate (engage) the slip clutches 61 to start driving the belts either at the same time or somewhat before the electric clutch/brake unit 27 is actuated, and to maintain the slip clutches engaged for driving the belts until the electric clutch/brake unit 27 is deactuated or somewhat thereafter, the slip clutches then being deactuated to stop the belts. While engaged, the slip clutches permit slip in the drives from the unit 25 to the belts.

In the operation of the apparatus of FIGS. 1-7, the motor/speed reducer unit 25 is operated continuously. The clutch/brake unit 27 is actuated (i.e., its clutch is engaged, its brake disengaged) in timed relation to a function of the apparatus such as a filling function, the encoder 37 being operable to signal the programmable control 35 to actuate the unit 27 to start driving rolls 19 and 21 to unwind the web W from the supply roll R and feed it forward at the appropriate time. (e.g., when a scale has weighed out the quantity of product to be delivered for a package, and has dumped the product for delivery down through the mandrel 13 into the tubing T). The unit 27 remains actuated for an interval such as to cause rotation of the rolls 19 and 21 to feed forward a package length increment of the web, and is then deactuated. The interval may be determined and controlled via the programmable controller 35 or by means of an optical scanning system operating in conjunction with registration marks at package length intervals on the web in the case of preprinted web, or by means measuring the rotation of the rolls 19 and 21 in the case of unprinted web, or in other suitable manner well known in the art.

The programmable control 35 operates to actuate the valve 65 for engaging the slip clutches 61 to start driving the belts 41 either at the same time or somewhat before the rolls 19 and 21 start feeding the web W forward toward the forming shoulder 3. Thus, when the rolls 19 and 21 operate to feed the web forward, the belts are in operation and act to draw down the tubing T formed as the web passes over the forming shoulder 3. The drive for the belts is such that they tend to travel at a rate greater than the rate at which rolls 19 and 21 feed the web forward. For example, they may tend to travel at a rate about 10% greater than the rate at which rolls 19 and 21 feed the web forward (that is, the belts if wholly free of any restraint would travel a distance 10% greater than the amount of web released (i.e., fed forward) by rolls 19 and 21. However, the tubing T cannot advance any faster than the rate at which rolls 19 and 21 feed the web forward without stretching (the web being caught in the nip of rolls 19 and 21) and the pull exerted by the belts on the tubing is relatively light and too low to cause any substantial stretching. Hence, the belts travel generally at a greater rate than the web and, in tending to travel faster than the web, exert a downward pull on the tubing T to tension it and thereby pull the material over the forming shoulder 3 under tension to maintain the web taut. The operation of the belts at a greater rate than the speed of the web feed is governed and controlled by slippage in the slip clutches 61, and by some slippage of the belts past the packaging material.

At the start of the downward feed of the tubing T, the seal bars 17 are open, and remain open throughout the downward feed of the tubing off the lower end of the mandrel 13. The means for moving the seal bars toward and away from one another is operable as in the second type of prior vertical form-fill-seal machines referred to above, well known in the art.

When the rolls 19 and 21 have measured out and fed forward one package length of web W, and the belts 41 have drawn the tubing T down one package length on the mandrel and fed one package length of the tubing T off the lower end of the mandrel, the clutch/brake unit 27 is deactuated to stop the rolls 19 and 21 and thereby stop the forward feed of the web, for the dwell of the web and the tubing for the sealing operation. The slip clutches 61 are deactuated either at the same time as the rolls 19 and 21 stop, or slightly thereafter. When deactuated, the slip clutches may be wholly disengaged so as to stop drives 63 to the belts 41, or they may remain lightly engaged to exert a light drive via 63 on the belts so that the belts exert a light draw-down force on the tubing to maintain tension in the tubing.

With the tubing T stopped, and with product in the tubing above the transverse seal at the lower end of the tubing (this seal being one package length below the seal bars at 5 and constituting the bottom seal for the package to be completed) the seal bars are closed on the tubing to form the top seal for the package P being completed and the bottom seal for the next package to be formed. The seal bars then open, and rolls 19 and 21 and belts 41 are operated through the next feed cycle.

The apparatus shown in FIGS. 1-7 wherein the web W is intermittently metered forward in package length increments by the rolls 19 and 21 and the tubing T is advanced by the belts 41 has been demonstrated dramatically to reduce both the breakaway pull and the continuous pull on the tubing in comparison to prior vertical form-fill-seal machines of the first type mentioned above, and more particularly in comparison to the standard Hayssen Manufacturing Company vertical form-fill-seal machine. The following chart shows the results of comparative tests on different packaging films of the breakaway and continuous pull for different packaging films on a standard Hayssen machine and a prototype of the apparatus shown in FIGS. 1-7:

TEST RESULTS

| Material Type | Trademark | Thickness Inches | Standard Vertical Form-Fill-Seal Machine Pull-Ounces | | Apparatus of FIGS. 1-7 Breakaway and Continuous Pull Ounces |
|---|---|---|---|---|---|
| | | | Breakaway | Continuous | |
| 1 Low Density PE | None | 0.0015 | 64 | 64 | 2 |
| 2 Low Density PE | None | 0.0015 | 54 | 56 | 2 |
| 3 Low Density PE | CURLON | 0.002 | 32 | 32 | 2 |
| 4 Low Density PE | VISQUEEN | 0.0025 | 32 | 52 | 2 |
| 5 Low Density Cast PE | REYNOLON | 0.004 | 56 | 72 | 8 |
| 6 Oriented PP | BICOR | 0.001 | 34 | 36 | 4 |
| 7 PP/PE/K-Cellophane | CURPOLENE 205 | 0.0043 | 104 | 112 | 2 |
| 8 K-Cellophane | None | 0.002 | 56 | 64 | 28 |
| 9 K-Cellophane | None | 0.002 | 48 | 56 | 26 |
| 10 HDPE/EVA | COEX | 0.0025 | 56 | 60 | 10 |
| 11 Paper-PE | None | 0.00375 | 216 | 224 | 66 |

PP = Polypropylene
PE = Polyethylene
K = Saran Coated
HDPE = High Density Polyethylene
EVA = Ethyl Vinyl Acetate In the tests on the standard Hayssen machine and the prototype of this invention, the same forming shoulder was used on both machines, being moved from one machine to the other for carrying out the tests, this forming shoulder being a chrome plated cast bronze shoulder dimensioned to form tubing with an internal diameter of about three inches, and with a lap seam of normal overlap. In each instance, the width of the film was 10½ inches (providing a lap seam about one inch wide). For each film tested, the film was drawn from a supply roll mounted in the machine and formed into tubing over the shoulder. A small clamp was attached to the lower end of the tubing, and weights were added to the clamp to determine the amount of weight (the pull) required (1) to start the film moving, which was the "breakaway" pull; and (2) to keep the film moving, which was the "continuous" pull. In the case of the standard machine, the carriage (carrying the seal bars) was maintained out of operation at the lower end of its stroke, the weight (force) applied to the lower end of the tubing taking the place of the carriage and seal bars for pulling the tubing down. In the case of the prototype of this invention, belts 41 were deactuated so that they did not extert any pull on the tubing, the breakaway and continuous pull being determined by means of the weights with the rolls 19 and 21 in operation to feed the film forward from the supply roll R to the forming shoulder.

As is apparent from the chart, the amount of pull required to form the flat web of film (for each film) into tubing, i.e., the amount of pull required to pull the film over the forming shoulder 3, was much less in the new machine than in the old. For example, where a 104 ounce breakaway pull and a 112 ounce continuous pull was required in the old machine for item 7, only a 2 ounce breakaway pull and a 2 ounce continuous pull was required in the new machine.

Figure 8:
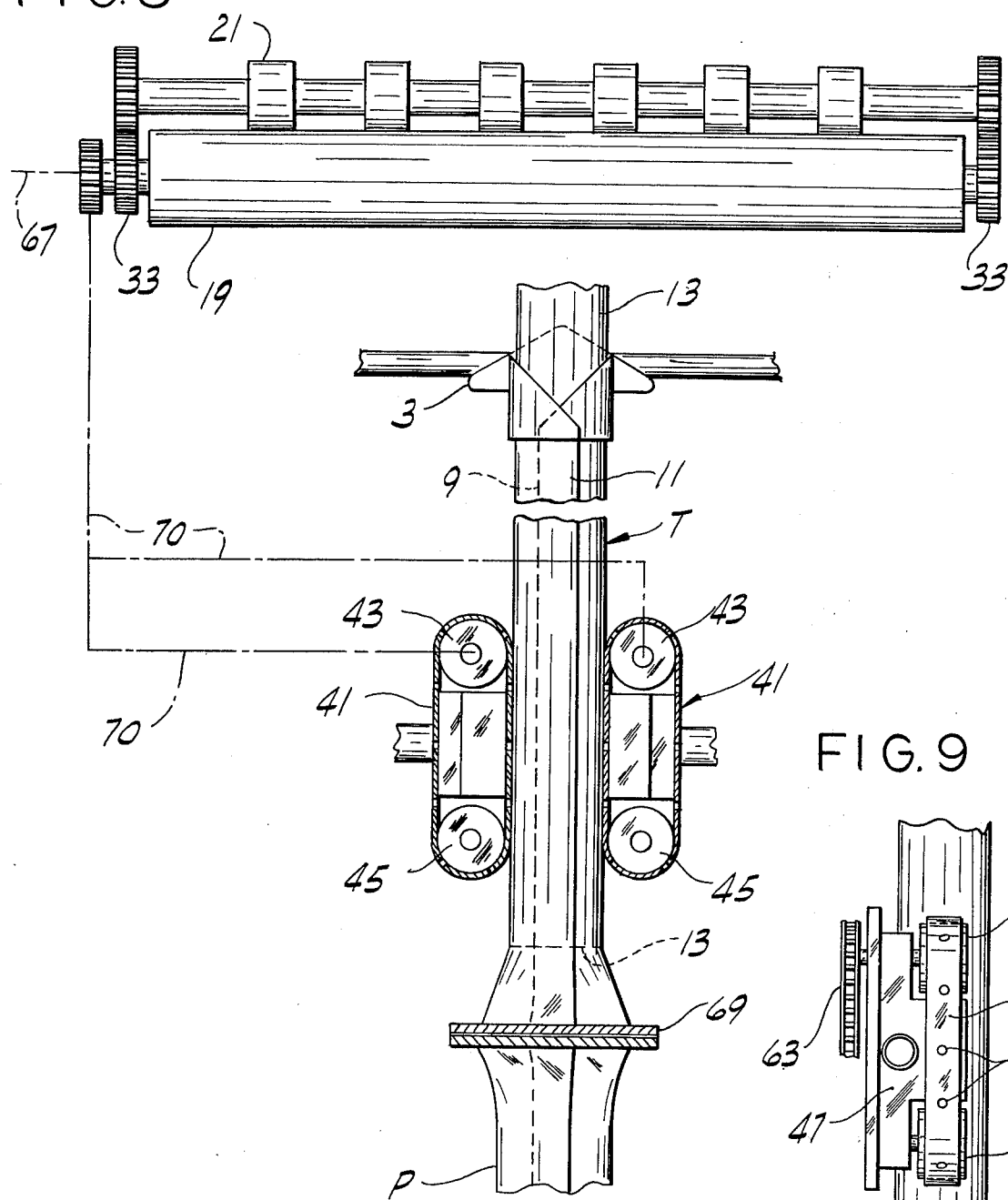
FIGS. 8 and 9 are views similar to FIGS. 2 and 3 showing another embodiment of the invention.
Figure 9:
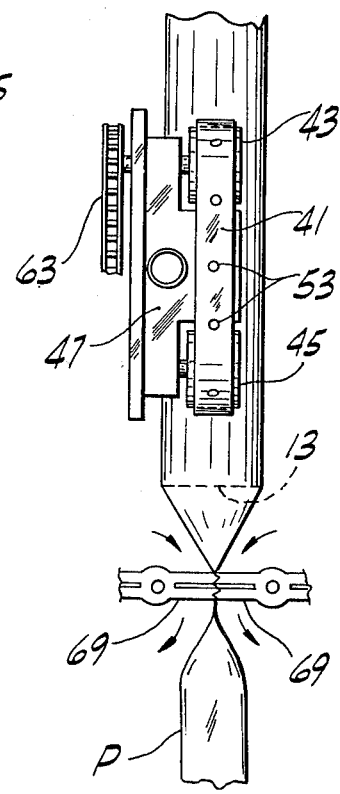

FIGS. 8 and 9 illustrate a second embodiment of the invention wherein the web W is fed continuously from the supply roll R and formed continuously into tubing T, the latter being advanced continuously and sealed to form packages as it continuously advances. This second embodiment is similar to the first except that the rolls 19 and 21, instead of being intermittently driven to advance a package length increment of the web W, are continuously driven by a suitable drive such as indicated at 67 to advance one package length for each sealing operation, and the belts 41 are continuously driven in timed relation to the rolls 19 and 21 by suitable drives such as indicated at 70 in FIG. 8 operable to cause the belts to tend to advance the tubing at a somewhat faster rate than that at which the rolls 19 and 21 feed the web. Seal bars 69 are continuously operable in suitable conventional manner (e.g., by being rotatable as illustrated in FIG. 9) for forming the transverse seals across the tubing. In this version of the machine, the rolls 19 and 21 function to feed a package length increment of the web forward in a given interval, and the belts 41 (which tend to run at a faster linear rate of speed than the linear rate of speed of the periphery of one or the other of rolls 19 and 21) tend to draw the tubing T forward a distance greater than the package length increment in that interval. Thus, with rolls 19 and 21 feeding a package length increment X of web forward in every second (for a production rate of 60 packages per minute), belts 41 would tend to feed 110% X (for example) forward every second, the X increment thereby being taken up and pulled over the forming shoulder under tension. Here again the drives 70 may include slippage means to allow for operation of the belts 41 at the speed of web feed (which is determined by the speed of rolls 19 and 21).

The filling of the packages may be carried out in conventional manner, well-known in the art, either on an intermittent fill basis, or, in the case of a liquid product through which the transverse seals may be made, by maintaining liquid product in the tubing above the level at which the transverse seals are made.

The principles of the invention are regarded as applicable not only to intermittently operable vertical form-fill-seal machines and continuously operable vertical form-fill-seal machines, as above described, but also to horizontal form-fill-seal machines, either intermittently or continuously operable. Reference is made to U.S. Pat. No. 2,966,021 issued Dec. 27, 1960 for an example of a continuously operable vertical form-fill-seal machine (also showing the second type of filling mentioned in the preceding paragraph), and to U.S. Pat. No. 2,976,657 issued Mar. 28, 1961 for an example of a continuously operable horizontal form-fill-seal machine.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of forming, filling and sealing packages wherein a web of flexible packaging material is pulled from a supply and fed over means for forming it into tubing, and wherein product to be packaged is provided in the tubing and sealing operations are performed on the tubing to seal it to form packages, characterized in that the web is pulled from the supply, measured for each sealing operation, and fed toward the forming means by applying a forward force to the web between the supply and the forming means, and a forward force is applied separately to the tubing to draw the tubing forward, the latter force being applied to the tubing at a rate such as to pull the material forward over the forming means with the material under tension to maintain it taut, the measurement of the web for each sealing operation being effected before the forming of the web by the forming means.

2. The method of claim 1 wherein the first-mentioned force is applied to the web intermittently to feed forward one package length increment of the web with a dwell between successive feed cycles during which the tubing is sealed.

3. The method of claim 2 wherein the said separate force is intermittently applied to the tubing concurrently with each application of the first-mentioned force to the web.

4. The method of claim 1 wherein both forces are applied continuously to the web.

5. The method of claim 1 wherein the first-mentioned force is applied to the web in such manner as to feed the web forward at a predetermined rate, and the said separate force is applied to the tubing in such manner as to tend to draw the tubing forward at a higher rate, but with slippage, whereby the web as measured and fed forward by the application of the first-mentioned force is taken up and pulled over the forming means under tension.

6. The method of claim 5 wherein the first-mentioned force is applied to the web intermittently to feed forward one package length increment of the web with a dwell between successive feed cycles during which the tubing is sealed.

7. The method of claim 6 wherein the said separate force is intermittently applied to the tubing concurrently with each application of the first-mentioned force to the web to take up each said increment and pull it over the forming means under tension.

8. The method of claim 5 wherein both forces are applied continuously to the web.

9. The method of claim 1 wherein the forming means forms the web into the tubing around a generally vertical mandrel, the tubing being sealed below the lower end of the mandrel, wherein the first-mentioned force is applied to the web through a web feeding means between the supply and the forming means, and wherein the said separate force is applied to the tubing by a tubing feeding means along the mandrel to feed the tubing down on the mandrel and off its lower end.

10. The method of claim 9 wherein the web feeding means is operated intermittently to feed forward one package length increment of the web with a dwell between successive feed cycles during which the tubing is sealed.

11. The method of claim 10 wherein the tubing feeding means is intermittently operated concurrently with the web feeding means.

12. The method of claim 9 wherein both the web feeding means and the tubing feeding means are continuously operated.

13. The method of claim 9 wherein the web feeding means feeds the web forward at a predetermined rate and the tubing feeding means tends to feed the tubing downward at a higher rate, but with slippage, whereby the web fed forward by the web feeding means is taken up and pulled over the forming means under tension.

14. The method of claim 13 wherein the web feeding means is operated intermittently to feed forward one package length increment of the web with a dwell between successive feed cycles during which the tubing is sealed.

15. The method of claim 14 wherein the tubing feeding means is intermittently operated concurrently with the web feeding means.

16. The method of claim 14 wherein the tubing feeding means is started before the web feeding means starts and stopped after the web feeding means stops.

17. The method of claim 13 wherein both the web feeding means and the tubing feeding means are continuously operated.

18. Apparatus for forming, filling and sealing packages wherein a web of flexible packaging material is pulled from a supply and fed over means for forming it into tubing, and wherein product to be packaged is provided in the tubing and sealing operations are performed on the tubing to seal it to form packages, characterized in having web feeding and measuring means located between the supply and the forming means for applying a forward force to the web between the supply and the forming means for measuring the web for each sealing operation and feeding the web forward toward the forming means, and tubing feeding means downstream from the forming means for applying a forward force separately to the tubing to draw the tubing forward, the latter force being applied to the tubing at a rate such as to pull the material forward over the forming means with the material under tension to maintain it taut, the web feeding and measuring means being operable to effect the measurement of the web for each sealing operation before the forming of the web by the forming means.

19. Apparatus as set forth in claim 18 having means for operating the web feeding and measuring means intermittently to feed forward one package length increment of the web in each interval of operation of the web feeding and measuring means, with a dwell between successive feed cycles during which the tubing is sealed.

20. Apparatus as set forth in claim 19 having means for operating the tubing feeding means intermittently concurrently with each operation of the web feeding and measuring means.

21. Apparatus as set forth in claim 18 having means for continuously operating the web feeding and measuring means and the tubing feeding means.

22. Apparatus as set forth in claim 18 having means for operating the web feeding and measuring means at a predetermined rate and means for operating the tubing feeding means in such manner as to tend to draw the tubing forward at a higher rate, but with slippage, whereby the web fed forward by the web feeding and measuring means is taken up and pulled over the forming means under tension.

23. Apparatus as set forth in claim 22 wherein the means for operating the web feeding and measuring means is operable intermittently to cause the web feeding and measuring means to feed forward one package length increment in each interval of operation of the web feeding and measuring means, with a dwell between successive feed cycles during which the tubing is sealed.

24. Apparatus as set forth in claim 23 wherein the means for operating the tubing feeding means is operable intermittently concurrently with each operation of the web feeding and measuring means.

25. Apparatus as set forth in claim 22 wherein the means for operating the web feeding and measuring means and the means for operating the tubing feeding means are both operable continuously.

26. Apparatus as set forth in claim 18 having a generally vertical mandrel, the forming means forming the web into the tubing around the mandrel, the tubing being sealed below the lower end of the mandrel, the tubing feeding means being engageable with the tubing on the mandrel to feed the tubing down on the mandrel and off its lower end.

27. Apparatus as set forth in claim 26 having means for operating the web feeding and measuring means intermittently to feed forward one package length increment of the web in each interval of operation of the web feeding and measuring means, with a dwell between successive feed cycles during which the tubing is sealed.

28. Apparatus as set forth in claim 27 having means for operating the tubing feeding means intermittently concurrently with each operation of the web feeding and measuring means.

29. Apparatus as set forth in claim 28 wherein the means for operating the tubing feeding means is operable to start it before the web feeding and measuring means starts and to stop it after the web feeding and measuring means stops.

30. Apparatus as set forth in claim 26 having means for continuously operating the web feeding and measuring means and the tubing feeding means.

31. Apparatus as set forth in claim 26 wherein the tubing feeding means comprises vacuum belt means.

32. Apparatus as set forth in claim 31 having means for operating the web feeding and measuring means intermittently to feed the web forward at a predetermined rate one package length increment in each interval of operation of the web feeding and measuring means with a dwell between successive feed cycles during which the tubing is sealed, and means for operating the vaccum belt means intermittently concurrently with each operation of the web feeding and measuring means and in such manner that the belt means tends to draw the tubing down at a higher rate, with slippage in the means for operating the belt means.

* * * * *

REEXAMINATION CERTIFICATE (323rd)
United States Patent [19]
James

[11] B1 4,288,965
[45] Certificate Issued Mar. 26, 1985

[54] FORM-FILL-SEAL PACKAGING METHOD AND APPARATUS

[75] Inventor: Robert C. James, Sheboygan, Wis.

[73] Assignee: Hayssen Manufacturing Company, Sheboygan, Wis.

Reexamination Request:
No. 90/000,506, Feb. 17, 1984

Reexamination Certificate for:
Patent No.: 4,288,965
Issued: Mar. 26, 1985
Appl. No.: 69,828
Filed: Aug. 27, 1979

[51] Int. Cl.³ .................. B65B 9/06; B65B 57/04
[52] U.S. Cl. .................... 53/451; 53/64; 53/551
[58] Field of Search .......... 53/551, 552, 451, 450, 53/554, 389, 64, 550; 493/302, 248, 439; 226/108, 188

[56] References Cited
U.S. PATENT DOCUMENTS

| | | | |
|---|---|---|---|
| 2,113,636 | 4/1938 | Vogt | 53/551 X |
| 2,113,658 | 4/1938 | Lakso | 53/551 |
| 2,361,052 | 10/1944 | Patterson | 53/551 X |
| 2,741,079 | 4/1956 | Rausing | 53/551 |
| 2,955,398 | 10/1960 | Dreeben | 53/551 |
| 2,966,021 | 12/1960 | Lane et al. | 53/552 |
| 2,969,627 | 1/1961 | Leasure | 53/451 |
| 3,071,907 | 1/1963 | Järund | 53/64 |
| 3,449,888 | 6/1969 | Gausman | 53/552 |
| 3,530,642 | 9/1970 | Leimert | 52/551 |
| 3,572,568 | 3/1971 | Lutz et al. | 226/108 |
| 3,844,090 | 10/1974 | Pepmeier | 53/551 |
| 4,117,647 | 10/1978 | Rossi | 53/551 X |
| 4,171,605 | 10/1979 | Putnam, Jr. et al. | 53/552 |

FOREIGN PATENT DOCUMENTS

| | | |
|---|---|---|
| 1511837 | 8/1969 | Fed. Rep. of Germany |
| 2005640 | 8/1971 | Fed. Rep. of Germany |
| 827792 | 2/1960 | United Kingdom |
| 1420471 | 1/1976 | United Kingdom |

*Primary Examiner*—Horace M. Culver

[57] ABSTRACT

A form-fill-seal packaging method and apparatus in which a web of flexible packaging material is pulled from a supply and fed over a device for forming it into tubing, product to be packaged is provided in the tubing, and the tubing is sealed to form packages, and in which the web is pulled forward from the supply as one operation and the tubing is drawn forward and thereby taken up as an accompanying but separate operation with the take-up such that the web is pulled over the forming device under tension.

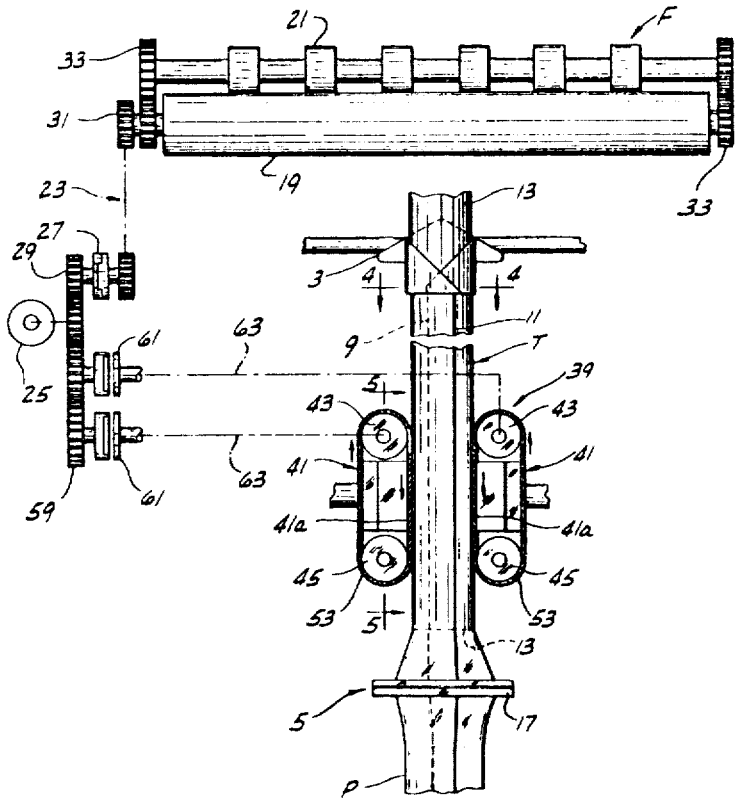

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-32 are cancelled.

New claims 33-42 are added and determined to be patentable.

33. *The method of forming, filling and sealing packages comprising:*

*intermittently pulling a web of flexible packaging material from a supply and measuring successive package length increments of the web as it is pulled from the supply to establish the package length with accompanying intermittent forward feed of the web in said package length increments on successive feed cycles to means for forming the web into tubing with the tubing surrounding a downwardly extending tubular mandrel;*

*said pulling, measuring and feeding of the web being effected by intermittently applying a forwarding force to the web between the supply and the forming means to feed a package length increment of the web forward;*

*intermittently pulling the tubing down on the mandrel during each feed cycle at the same time that each package length increment of the web is intermittently fed forward to the forming means;*

*said downward pulling of the tubing being effected by applying a separate and downward force to the tubing such as to pull the web over the forming means under sufficient tension to maintain it taut;*

*the tubing being thereby intermittently drawn down on the mandrel in a package length increment and intermittently fed downwardly off the lower end of the mandrel in a package length increment on each feed cycle;*

*the tubing being intermittently sealed below the lower end of the mandrel at package length intervals by sealing means which is opened for the downward feed of the tubing on each feed cycle and closed on a dwell of the tubing between successive feed cycles;*

*product to be packaged being delivered downwardly through the mandrel and out of its lower end into the lower end of the tubing;*

*the measurement of the package length increments of the web to establish the package length being effected solely before the forming of the web into the tubing and independently of the drawing down and sealing of the tubing thereby to form seals spaced with respect to the tubing a distance depending solely on said measurement.*

34. *The method of claim 33 wherein the web is intermittently pulled from the supply and fed toward the forming means at a predetermined rate, and the downward pull on the tubing by said separate force is such as to tend to pull the tubing downward at a higher rate, but with slippage, for tensioning the web.*

35. *The method of claim 34 wherein the downward pulling of the tubing starts before and stops after the pulling, measuring and feeding of the web.*

36. *Apparatus for forming, filling and sealing packages comprising:*

*a downwardly extending tubular mandrel for delivery of product to be packaged downwardly therethrough and out of the lower end of the mandrel;*

*means for forming a web of flexible packaging material into tubing surrounding the mandrel;*

*web measuring means operable intermittently to pull a web of said material from a supply, measure successive package length increments of the web as it is pulled from the supply to establish the package length, and intermittently feed the web forward in said package length increments on successive feed cycles to said forming means;*

*means for intermittently pulling the tubing down on the mandrel during each feed cycle at the same time that each package length increment of the web is intermittently fed forward to the forming means;*

*said means for pulling the tubing down on the mandrel being operable to pull the web over the forming means under sufficient tension to maintain it taut, and operable intermittently to draw the tubing down on the mandrel one package length and feed it downwardly off the lower end of the mandrel in a package length increment on each feed cycle;*

*sealing means for intermittently sealing the tubing below the lower end of the mandrel, said sealing means being opened for the downward feed of the tubing on each feed cycle and closed on the tubing on a dwell of the tubing between successive feed cycles;*

*product to be packaged being delivered downwardly through the mandrel and out of its lower end into the tubing;*

*measurement of the package length increments of the web to establish the package length being effected by the web measuring means before the forming of the web into the tubing by the forming means and independently of the means for pulling the tubing down and the sealing means, thereby to form seals spaced with respect to the tubing a distance depending solely on said measurement.*

37. *Apparatus as set forth in claim 36 wherein the web measuring means is intermittently operable to pull the web and feed it forward at a predetermined rate and wherein the means for intermittently pulling the tubing down on the mandrel is operable to tend to draw the tubing downward at a higher rate, but with slippage, for tensioning the web.*

38. *Apparatus as set forth in claim 37 having means for starting the tubing pulling means before and stopping it after the web measuring means.*

39. *Apparatus as set forth in claim 36 wherein the sealing means is operable in a fixed generally horizontal plane below the lower end of the mandrel.*

40. *Apparatus as set forth in claim 39 wherein the web measuring means is intermittently operable to pull the web and feed it forward at a predetermined rate, and having drive means for the tubing pulling means including slip clutch means for driving the tubing pulling means to tend to draw the tubing downward at a higher rate, but with slippage, for tensioning the web.*

41. *Apparatus as set forth in claim 40 having means for starting the drive means for the tubing pulling means before and stopping it after the web measuring means.*

42. *Apparatus as set forth in claim 41 wherein the tubing pulling means comprises vacuum belt means.*

* * * * *